US012563355B2

(12) United States Patent
Hersbach et al.

(10) Patent No.: US 12,563,355 B2
(45) Date of Patent: Feb. 24, 2026

(54) HEARING SYSTEM FITTING

(71) Applicant: Cochlear Limited, Macquarie University (AU)

(72) Inventors: Adam Hersbach, Richmond (AU); Ruth English, Newport (AU)

(73) Assignee: Cochlear Limited, Macquarie University (AU)

( * ) Notice: Subject to any disclaimer, the term of this patent is extended or adjusted under 35 U.S.C. 154(b) by 309 days.

(21) Appl. No.: 18/558,004

(22) PCT Filed: Apr. 20, 2022

(86) PCT No.: PCT/IB2022/053688
§ 371 (c)(1),
(2) Date: Oct. 30, 2023

(87) PCT Pub. No.: WO2022/234376
PCT Pub. Date: Nov. 10, 2022

(65) Prior Publication Data

US 2024/0223977 A1 Jul. 4, 2024

Related U.S. Application Data

(60) Provisional application No. 63/183,840, filed on May 4, 2021.

(51) Int. Cl.
*H04R 25/00* (2006.01)

(52) U.S. Cl.
CPC ............ *H04R 25/70* (2013.01); *H04R 25/30* (2013.01); *H04R 25/505* (2013.01); *H04R 2225/67* (2013.01)

(58) Field of Classification Search
CPC .. H04R 2225/67; H04R 25/30; H04R 25/505; H04R 25/554; H04R 25/70
USPC .......................................................... 381/60
See application file for complete search history.

(56) References Cited

U.S. PATENT DOCUMENTS

| | | | |
|---|---|---|---|
| 8,406,441 B2 | 3/2013 | Ruwisch | |
| 2016/0080878 A1 | 3/2016 | Hillbratt et al. | |
| 2017/0180895 A1 | 6/2017 | Flynn et al. | |
| 2018/0279949 A1 | 10/2018 | Thibaut et al. | |
| 2019/0387328 A1 | 12/2019 | Kring et al. | |

FOREIGN PATENT DOCUMENTS

KR 10-1209126 B1 12/2012

OTHER PUBLICATIONS

International Search Report and Written Opinion in counterpart International Application No. PCT/IB2022/053688, mailed Aug. 2, 2022, 6 pages.

*Primary Examiner* — Phylesha Dabney
(74) *Attorney, Agent, or Firm* — Edell, Shapiro & Finnan, LLC

(57) ABSTRACT

Presented here are embodiments for calibrating a bimodal hearing system that includes a cochlear implant with an implantable microphone. Calibration of the implantable microphone is influenced by skull vibrations induced by a separate hearing aid of the bimodal system. Thus, two sets of calibration measurements are obtained both with and without the hearing aid unmuted. Calibration parameters such as frequency response, noise floor parameters, and vibration calibration constants can then be derived based on the two sets of measurements.

29 Claims, 8 Drawing Sheets

HEARING SYSTEM FITTING

BACKGROUND

Field of the Invention

The present invention relates generally to fitting hearing systems.

Related Art

Medical devices have provided a wide range of therapeutic benefits to recipients over recent decades. Medical devices can include internal or implantable components/devices, external or wearable components/devices, or combinations thereof (e.g., a device having an external component communicating with an implantable component). Medical devices, such as traditional hearing aids, partially or fully-implantable hearing prostheses (e.g., bone conduction devices, mechanical stimulators, cochlear implants, etc.), pacemakers, defibrillators, functional electrical stimulation devices, and other medical devices, have been successful in performing lifesaving and/or lifestyle enhancement functions and/or recipient monitoring for a number of years.

The types of medical devices and the ranges of functions performed thereby have increased over the years. For example, many medical devices, sometimes referred to as "implantable medical devices," now often include one or more instruments, apparatus, sensors, processors, controllers or other functional mechanical or electrical components that are permanently or temporarily implanted in a recipient. These functional devices are typically used to diagnose, prevent, monitor, treat, or manage a disease/injury or symptom thereof, or to investigate, replace or modify the anatomy or a physiological process. Many of these functional devices utilize power and/or data received from computing systems that are part of, or operate in conjunction with, implantable components.

SUMMARY

One aspect disclosed is a method of fitting a bimodal hearing system. The method includes enabling a hearing aid positioned at a first ear of a recipient, while the hearing aid is unmuted, providing audible instructions to the recipient, while the hearing aid is unmuted, obtaining at least a first calibration measurement of an implantable microphone located at a second ear of the recipient, muting the hearing aid; and while the hearing aid is muted, obtaining at least a second calibration measurement of the implantable microphone.

Another aspect disclosed is one or more non-transitory computer readable storage media comprising instructions that, when executed by a processor, cause the processor to perform operations. The operations include enabling a contralateral hearing aid positioned at a first ear of a recipient, wherein an implantable auditory prosthesis comprising an implantable sound sensor is implanted at a second ear of the recipient, while the contralateral hearing aid is enabled, providing instructions to the recipient via the contralateral hearing aid, disabling the contralateral hearing aid, while the contralateral hearing aid is disabled, performing at least one first calibration measurement of the implantable sound sensor; and enabling the contralateral hearing aid. In some embodiments, the operations further include while the while the contralateral hearing aid is enabled, performing at least one second calibration measurement of the implantable sound sensor, and calibrating the implantable sound sensor based on the at least one first calibration measurement and the at least one second calibration measurement.

Another aspect disclosed is an apparatus. The apparatus includes hardware processing circuitry, and one or more memories storing instructions that when executed configure the hardware processing circuitry to perform operations. The operations include programmatically unmuting a hearing aid positioned at a first ear of a recipient, while the hearing aid is unmuted, generating an audio output signal, the audio output signal providing instructions to the recipient via the hearing aid, while the hearing aid is unmuted, obtaining a first calibration measurement of an implantable auditory prosthesis that includes a microphone implanted at a second ear of the recipient, programmatically muting the hearing aid, while the hearing aid is muted, obtaining a second calibration measurement; of the implantable auditory prosthesis; and downloading calibration information to the implantable auditory prosthesis based on the first calibration measurement and the second calibration measurement.

BRIEF DESCRIPTION OF THE DRAWINGS

Embodiments of the present invention are described herein in conjunction with the accompanying drawings, in which.

DETAILED DESCRIPTION

Figure 1A:
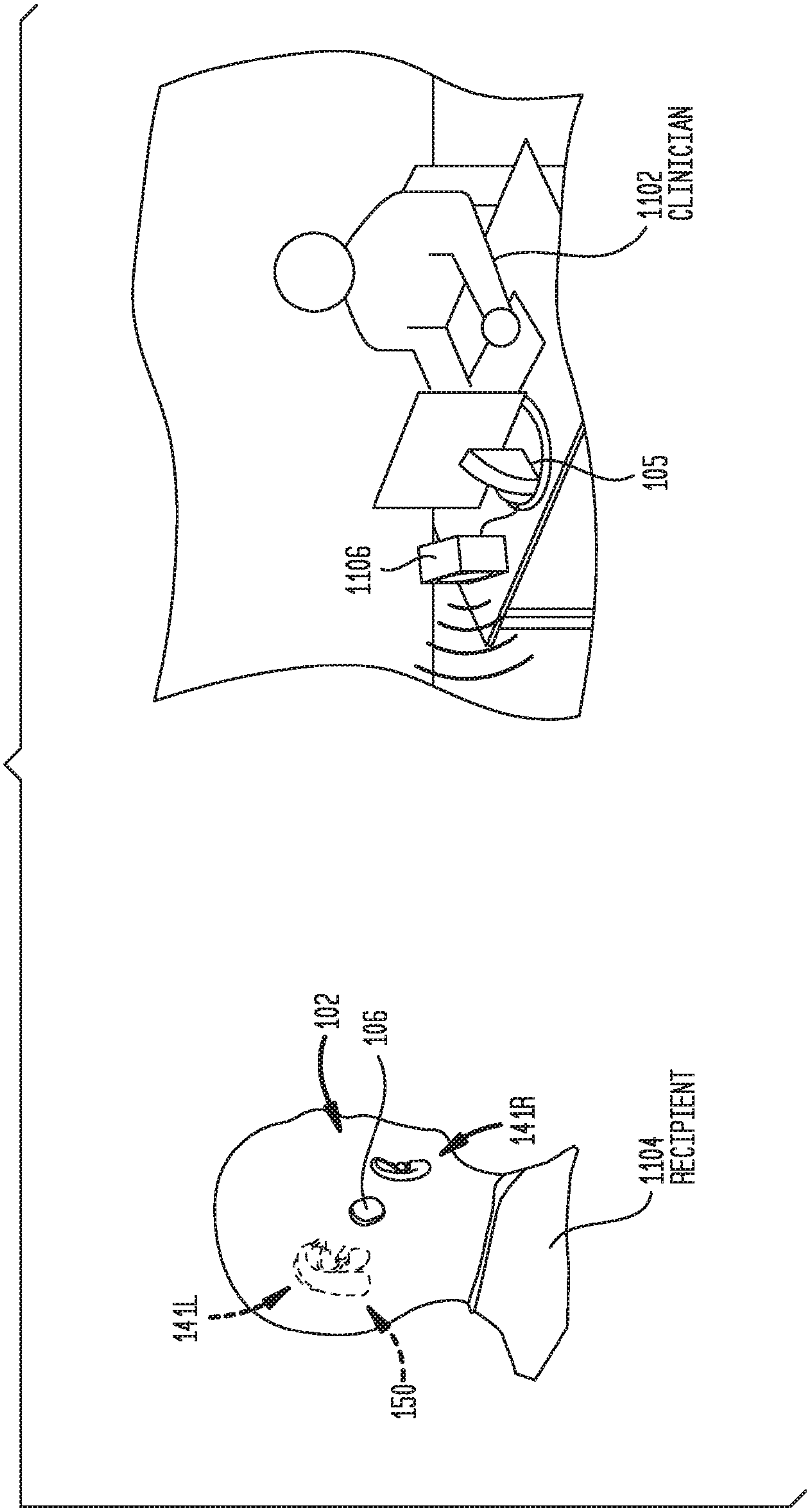
FIG. 1A is an overview diagram depicting a fitting session of a bimodal hearing system comprising a hearing aid and a cochlear implant having an implantable microphone, in accordance with certain embodiments presented herein.

As noted, medical devices and medical device systems (e.g., including multiple implantable medical devices) have provided a wide range of therapeutic benefits to recipients over recent decades. For example, a hearing device system (hearing system) is a type of implantable medical device system that includes one or more hearing devices that operate to convert sound signals into one or more of acoustic, mechanical, and/or electrical stimulation signals for delivery to a recipient. The one or more hearing devices that can form part of a hearing system include, for example, hearing aids, cochlear implants, middle ear stimulators, bone conduction devices, brain stem implants, electro-acoustic cochlear implants or electro-acoustic devices, and other devices providing acoustic, mechanical, and/or electrical stimulation to a recipient.

One specific type of hearing prosthesis system, referred to herein as a "binaural hearing prosthesis system" or more simply as a "binaural hearing system," includes two hearing devices, where one of the two hearing devices is positioned at each ear of the recipient. In a binaural system, each of the two hearing devices provides stimulation to one of the two ears of the recipient (i.e., either the right or the left ear of the recipient).

Binaural hearing systems can generally be classified as either a "bilateral" hearing system or a "bimodal" hearing system. A bilateral hearing system is a system in which the two hearing devices provide the same type/mode of stimulation to a recipient. For example, a bilateral hearing system can comprise two cochlear implants, two hearing aids, two bone conduction devices, etc. In contrast, a bimodal hearing system is a system in which the two hearing devices provide different types/modes of stimulation to each ear of the recipient. For example, a bimodal system can comprise a cochlear implant at a first ear of the recipient and a hearing aid at the second ear of recipient, a cochlear implant at a first ear of the recipient and a bone conduction device at a second ear of the recipient, etc.

Some bimodal hearing systems include a hearing device, such as cochlear implant, having an implantable (subcutaneous) microphone configured to detect/receive acoustic sound signals (sound signals) originating from outside of the body of the recipient. Implantable microphones are positioned below/under the recipient's skin/tissue, generally proximate to bone (e.g., the skull bone). As such, implantable microphones are generally sensitive to vibrations, including skull vibrations and body noises. To mitigate such vibration based interference, an additional vibration sensor (e.g., an accelerometer) is also typically implanted in a recipient. Signal processing (e.g., such as body noise cancellation and/or reduction) is applied to both the signals captured by the implantable microphone and by the vibration sensor to identify and attenuate the vibrations.

In certain circumstances, a bimodal hearing system can include a hearing device with implantable microphone located at a first (ipsilateral) ear, and a hearing aid located at a second (contralateral) ear. In such a system, the hearing aid located at the second ear, sometimes referred to herein as a contralateral hearing aid, can be a source of vibration induced into the skull and detected by the implantable microphone of the hearing device at the ipsilateral ear, sometimes referred to herein as the ipsilateral hearing device having an ipsilateral implantable microphone. This can be especially true when the contralateral hearing aid is set to use a relatively high gain when generating output acoustic signals to the contralateral ear.

As noted, the vibration induced by the contralateral hearing aid can be received through the skull at the ipsilateral implantable microphone. During normal use of the ipsilateral hearing device, this induced vibration is attenuated by the body noise canceller along with other vibration-based signals. However, in some cases, where the contralateral hearing aid uses a relatively high gain, the body noise canceller is unable to sufficiently attenuate the induced vibration detected by the ipsilateral microphone. This can negatively impact performance of the ipsilateral hearing device during general use, but also during fitting. During general use of the device, the hearing aid causes unwanted distortion artifacts in the signal received at the implantable microphone, reducing sound quality. Furthermore, fitting of the ipsilateral hearing device can include, for example, measuring a frequency response of the implantable microphone, measuring a noise floor, and measuring one or more properties of acoustic and vibration-based inputs. However, due to the vibrations induced into the skull as described above, calibration of the device obtained during fitting can be negatively affected. The imprecise calibration further degrades performance of the ipsilateral hearing device.

As such, presented herein are techniques to selectively unmute and/or mute a contralateral hearing aid during a fitting session of an ipsilateral implantable hearing device having an implantable microphone. Different portions of a fitting session exhibit different characteristics. For example, a first portion of the fitting session includes obtaining threshold and comfort levels associated with the ipsilateral implantable hearing device. During this first portion, a recipient's task is generally repetitive but requires concentration by the recipient during the data gathering process. To facilitate this concentration, the contralateral acoustic hearing aid used by the recipient is typically muted.

During a second portion of the fitting process, the implantable microphone characteristics are measured. To obtain the measurements, a clinician communicates relatively complex instructions to a recipient. For example, the clinician provides instructions to the recipient to create particular acoustic environments from which measurement data is obtained (e.g., such as a vibration inducing activity e.g., recipient head scratching).

Therefore, to accomplish the second portion of the fitting process, there is a need to control the contralateral hearing aid. Some embodiments collect two versions of a particular measurement, one with the hearing aid enabled, and another with the hearing aid disabled. Enabling the hearing aid includes, for example, unmuting the hearing aid (e.g., allowing sound generation by the hearing aid), and, in some embodiments, permitting/enabling additional operations on the hearing aid (e.g., enabling power to one or more hardware components). Disabling the hearing aid includes, for example, muting the hearing aid (e.g., inhibiting generation of any sound by the hearing aid), and, in some embodiments, permitting/enabling additional operations on the hearing aid (e.g., disabling power to one or more components). These particular measurements are performed both with an output level of the hearing aid muted and unmuted. This provides for measurements both with and without the influence of the induced vibration from the hearing aid.

Other measurements made without the contralateral hearing aid enabled or otherwise muted allow the implantable microphone characteristics to be determined without interfering vibration, and to calibrate the ipsilateral hearing device. Measurements with the contralateral hearing aid unmuted allow determination of an influence of the hearing aid on the received signal. This provides for determination of a recommendation of a hearing aid maximum output level that provides for the best performance during normal use.

Some embodiments configure the contralateral hearing aid to selectively amplify one or more frequency bands, based, at least in part, on a determination of how much benefit said amplification provides to a particular recipient. In some embodiments, hearing aid gain prescription rules are used to determine amplification. This approach can be challenging with recipients having severe hearing loss. Prescription rules vary in an amount of amplification, and in most cases prescribe more and more gain as hearing thresholds increase. However, excessive hearing aid gain does not always produce effective audibility and the clinician is often tasked with a trade-off to achieve an acceptable fitting. The trade-off is further complicated in the bimodal case with implanted microphone due vibration based interference generated by high output levels of the contra-lateral hearing aid. Reducing amplification and/or restricting the maximum output level of such frequency bands provides a benefit by minimizing the amplification of audio artifacts within those frequency bands, especially when both the ipsilateral hearing device and the contralateral hearing aid are operating.

Merely for ease of description, the techniques presented herein are primarily described herein with reference to a specific medical device system, namely a bimodal hearing system comprising a cochlear implant located at a first ear of a recipient, sometimes referred to herein as an "ipsilateral cochlear implant" and a hearing aid located at a second ear of the recipient, sometimes referred to herein as a "contralateral hearing aid." However, it is to be appreciated that the techniques presented herein may also be used with a variety of other implantable medical device systems. For example, the techniques presented herein may be used with other hearing systems, including combinations of any of a cochlear implant, middle ear auditory prosthesis (middle ear implant), bone conduction device, direct acoustic stimulator, electro-acoustic prosthesis, auditory brain stimulator systems, etc. The techniques presented herein may also be used with systems that comprise or include tinnitus therapy devices, vestibular devices (e.g., vestibular implants), visual devices (i.e., bionic eyes), sensors, pacemakers, drug delivery systems, defibrillators, functional electrical stimulation devices, catheters, seizure devices (e.g., devices for monitoring and/or treating epileptic events), sleep apnea devices, electroporation devices, etc.

FIG. 1A is an overview diagram depicting a fitting session for a cochlear implant that includes an implantable microphone. FIG. 1A shows a clinician 1102 and a recipient 1104. The clinician, in collaboration with the recipient 1104, performs a fitting procedure to configure a cochlear implant system 102 to operate with a hearing aid 150, where the cochlear implant system 102 and the hearing aid 150 are both worn by the recipient 1104. As discussed above, the fitting session can include programming of thresholds and comfort levels of the cochlear implant system 102. During this process, the hearing aid 150 can be muted in order to avoid distraction of the recipient. The hearing aid 150 is generally not utilized during this portion of the fitting process, since there is not a need for the clinician 1102 to provide instructions to the recipient 1104 when setting the thresholds and comfort levels.

Since the cochlear implant system 102 includes an implantable microphone, part of the fitting session includes measuring properties of the implantable microphone. The clinician generally provides instructions to the recipient 1104 during the measurement process, and therefore it can be helpful for communication to have the hearing aid 150 in a functional state while the instructions are provided. However, if the hearing aid 150 is unmuted, it can induce vibration into a skull of the recipient 1104. For example, as part of measuring properties of the implantable microphone, the clinician generates test sounds using a speaker 1106. If the hearing aid 150 is unmuted while the test sounds are generated, the hearing aid 150 imparts at least some vibration into the skull of the recipient. These vibrations can disrupt equalization of the implantable microphone during the fitting process. Thus, the disclosed embodiments provide for the collection of fitting data during calibration or equalization of an implantable microphone when the hearing aid 150 is unmuted and also when the hearing aid 150 is muted. The measurements with the hearing aid 150 muted provide for the collection of calibration data without interference from hearing aid induced vibrations of the recipient's skull. Measurements collected with the hearing aid 150 unmuted allow for determination of an influence of the hearing aid 150 on the received signal. Calibration of the implantable microphone can then be established more accurately than with traditional fitting methods.

After appropriate calibration parameters have been established as a result of the fitting session 50, the clinician configures, via the computing device 105, the cochlear implant system 102. The configuration includes downloading calibration parameters and/or calibration constants to the cochlear implant system 102 that are derived from the fitting session 50. This improves performance of the cochlear implant system 102. In some embodiments, the clinician 1102 also downloads calibration parameters for the hearing aid 150. This can include limiting the gain and/or maximum output level of the contralateral hearing aid for the purpose of limiting vibration-based distortion in the ipsilateral cochlear implant. For example, in some fitting sessions, the clinician or the computing device provide instructions to the recipient to prepare to recognize a sound for the purpose of evaluating the hearing aid maximum output. An intense sound is then played within a particular frequency band, typically at a level of 90 dB sound pressure level (SPL). With the ipsilateral cochlear implant muted, the clinician then inquires as to whether the recipient was able to perceive the played sound via the contralateral hearing aid, and if so, at what sound level the sound was perceived. In cases where the maximum hearing aid output is not audible to (can't be heard by) the recipient, the benefit of amplification is assumed to be low, and the hearing aid gain and/or maximum output can be reduced so as to avoid vibration-based distortion in the ipsilateral cochlear implant. Depending on the answer, the clinician configures a gain level of the hearing aid 150 for sounds of the particular frequency band. For example, if the recipient is unable to perceive any sound at all within the particular frequency band, or indicates their perception of the sound was below some predefined threshold level, the hearing aid's gain for that frequency band is set to a zero or near zero value, at least in some embodiments. Additional tests are performed for a series of frequency bands, with perception of each sound within a frequency band establishing further indications of the recipient's perception of found across the series of frequency bands. Gain parameters for each of the series of frequency bands are then established consistent with the further indications. In some embodiments, the clinician uploads gain parameters (e.g., from the computer system 105) of one or more frequency bands to the hearing aid. As an alternative, a direct comparison of the hearing aid maximum output against the subjects hearing threshold can be made in to avoid the above described procedure. If the maximum output of the hearing aid does not exceed the hearing threshold at a particular frequency, the benefit of amplification is assumed to be low, and the hearing gain and/or maximum output can be reduced to avoid vibration-based distortion. The gain parameters established during the fitting session 50 are then downloaded to the hearing aid 150, as explained further below.

Figure 1B:
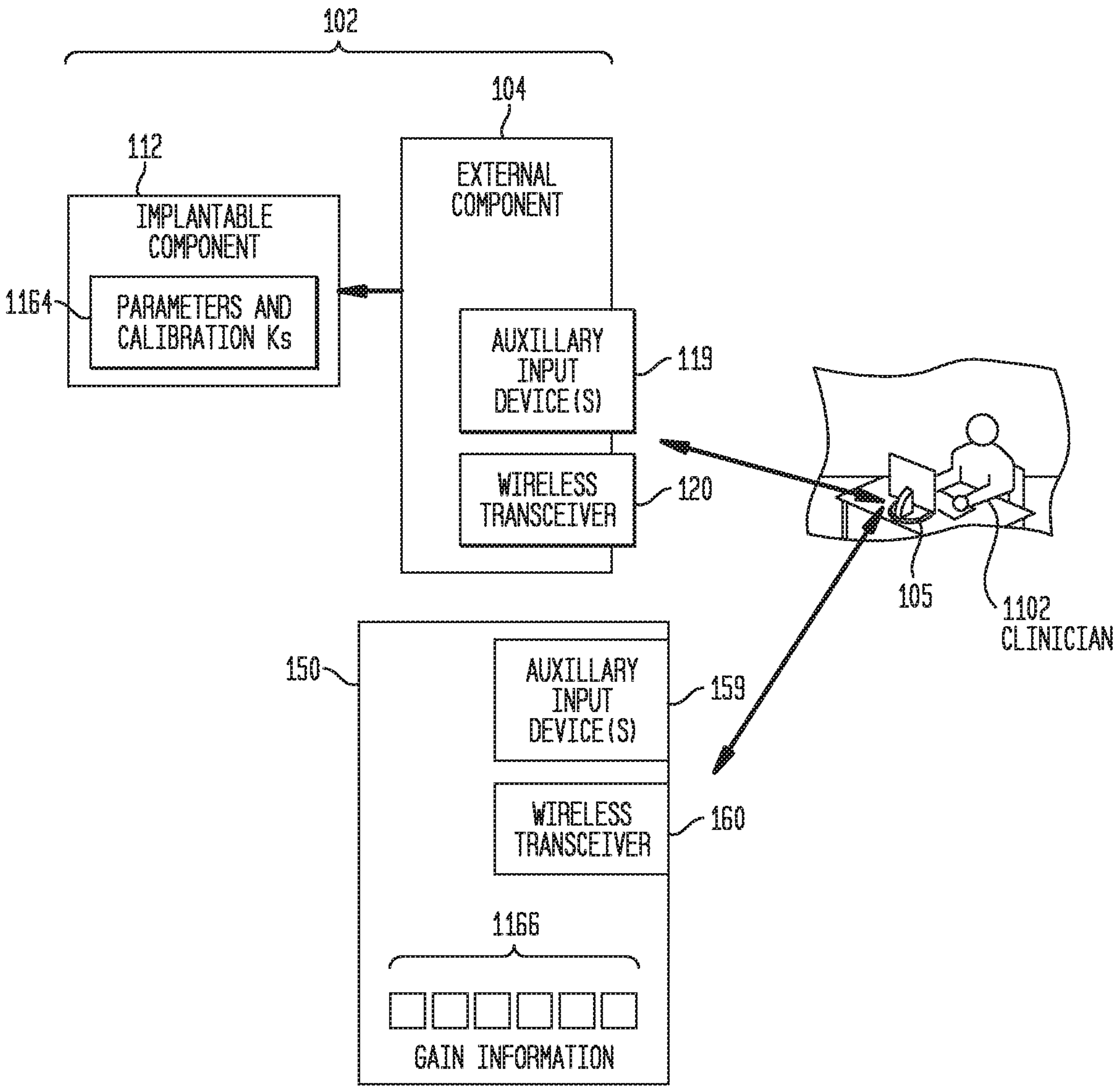
FIG. 1B is a diagram illustrating configuration of a cochlear implant, in accordance with certain embodiments presented herein.

FIG. 1B illustrates configuration of a bimodal hearing system according to an example embodiment. FIG. 1B shows the clinician 1102 of FIG. 1A interacting with the computing device 105 after calibration parameters have been determined during the fitting session 50 discussed above with respect to FIG. 1A. FIG. 1B also shows an expanded view of the cochlear implant system 102, and the hearing aid 150 of FIG. 1A. FIG. 1B shows the cochlear implant system 102 includes an external component 104 and an implantable component 112. The external component includes one or more auxiliary input devices 119, and/or a wireless transceiver 120. The one or more auxiliary input devices 119 and/or wireless transceiver 120 facilitate digital communication between the external component 104 and the computing device 105. Via this digital communication, the computing device 105 is able to download calibration parameters and/or constants to configure performance of the cochlear implant system 102 as discussed further below.

The external component 104 receives the calibration information from the computing device 105 and provides this information to the implantable component 112. As discussed above, some embodiments of the cochlear implant system 102 include an implantable microphone. Thus, in some embodiments, the calibration information calibrates one or more of a frequency response, noise floor, or vibration calibration of the implantable microphone below. Processing circuitry of the implantable component 112 utilizes the parameters and calibration constants 1164 provided by the computing device 105 to improve performance of the cochlear implant system 102.

FIG. 1B also shows the computing device 105 in communication with the hearing aid 150 via either an auxiliary input device 159 or a wireless transceiver 160. In some embodiments, the computing device 105 further downloads gain and/or maximum output level information for a plurality of different frequency bands to the hearing aid 150. As discussed above, some embodiments selectively reduce amplification and/or maximum output level of particular frequency bands to which the benefit of amplification is deemed to be low, as determined during the fitting session 50. Thus, the hearing aid 150 is configured to then selectively amplify sound based on the downloaded gain information which is stored at the hearing aid 150 as gain information 1166. By configuring the hearing aid 150 with gain information 1166, which defines gain parameters for a plurality of frequency bands, the computing device 105 improves the user experience with respect to the hearing aid 150.

In some embodiments, the clinician is also able to selectively unmute and/or mute the hearing aid 150 from the computing device 105. In some embodiments, the clinician initiates a fitting program running on the computing device 105 that programmatically and selectively unmutes and/or mutes the hearing aid 150 as the fitting session progresses. In some embodiments, the computing device 105 collects pairs of analogous calibration measurements, with one measurement in each pair collected with the hearing aid 150 unmuted, and a second measurement in each pair obtained with the hearing aid muted.

As discussed above, setting a frequency response of an implantable microphone of the cochlear implant system 102 can be made more accurate by obtaining sound measurements both with and without the hearing aid 150 being unmuted. This improvement provides for more effective compensation for skull vibrations resulting from the hearing aid 150 being unmuted.

In some embodiments, the computing device 105 is configured to play audio files that store test sound signals used for fitting the bimodal hearing system. For example, the computing device 105 is configured, in some embodiments, to selectively mute or unmute the hearing aid 150, play a test sound, and collect a calibration measurement while the test sound is being played. The computing device 105 is also configured, in some embodiments, to collect a calibration measurement during a period of relative silence, e.g., without playing any test sounds while the calibration measurement is collected.

Figure 2:
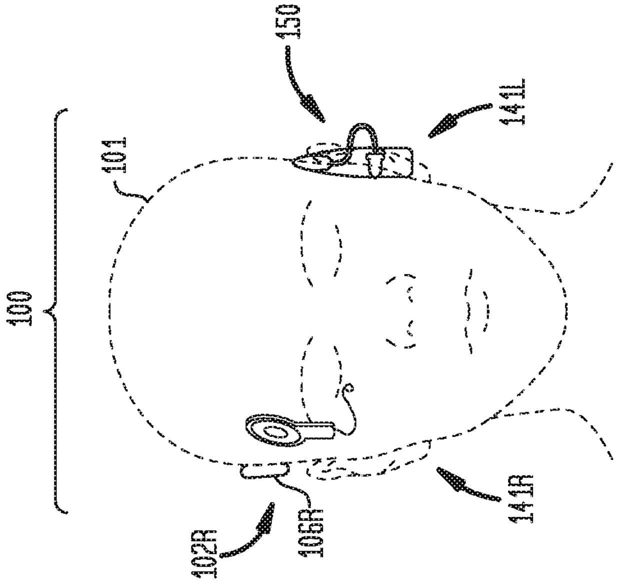
FIG. 2 is a schematic view of a bimodal hearing system with which certain embodiments presented herein can be implemented.
Figure 3:
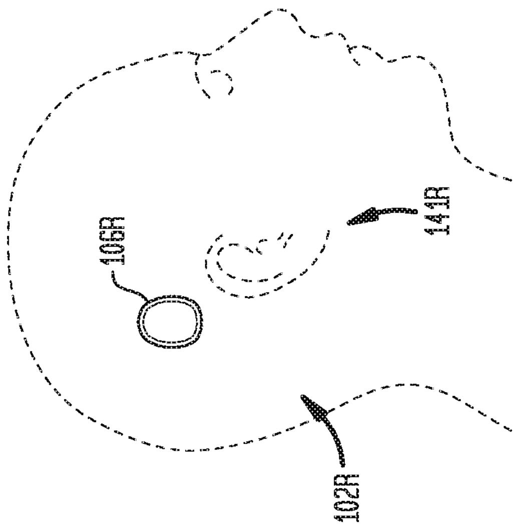
FIG. 3 is a side view of a recipient wearing the bimodal hearing system of FIG. 2.
Figure 4:
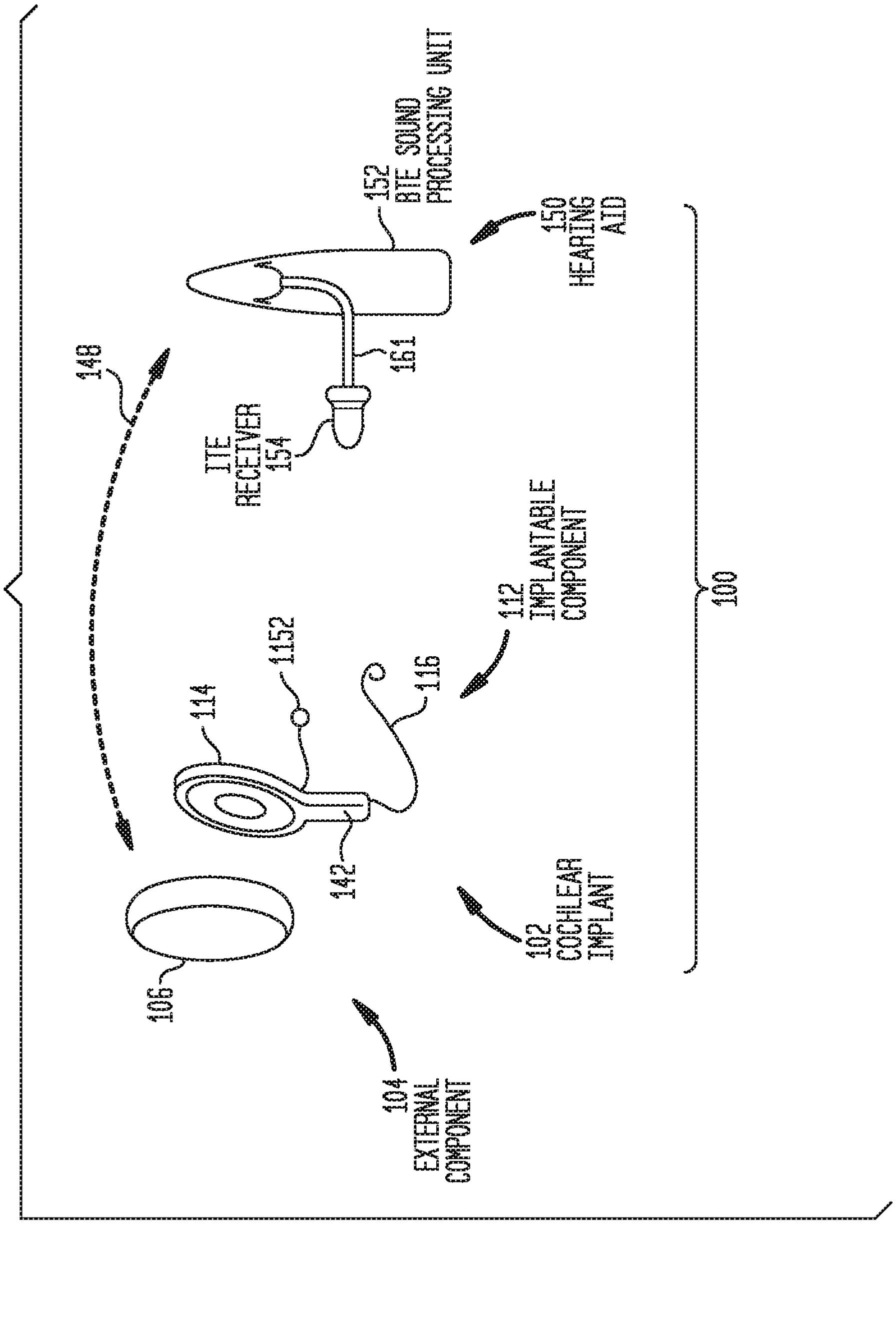
FIG. 4 is a schematic view of the components of the bimodal hearing system of FIG. 2.

FIGS. 2-6 are diagrams illustrating one example of a bimodal hearing system 100 in accordance with an example embodiment. As shown in FIGS. 2 and 3, the bimodal hearing system 100 comprises a cochlear implant system 102 and a hearing aid 150. FIGS. 2 and 3 are schematic drawings of a recipient wearing the cochlear implant system 102 at a left ear 141L of the recipient and wearing the hearing aid 150 at a right ear 141R of the recipient, while FIG. 4 is a schematic diagram illustrating each of the cochlear implant system 102 and the hearing aid 150 separate from the head 101 of the recipient.

As shown in FIG. 4, the cochlear implant system 102 includes an external component 104 that is configured to be directly or indirectly attached to the body of the recipient and an implantable component 112 configured to be implanted in the head 101 of recipient. The external component 104 comprises a sound processing unit 106, while the implantable component 112 includes an implantable coil 114, an implantable microphone 1152, a stimulator unit 142 and an elongate stimulating assembly 116 (including an electrode array), that is implanted in the recipient's left cochlea (not shown in FIG. 4). Hearing aid 150 comprises a sound processing unit 152 and an in-the-ear (ITE) component 154.

In the embodiment of FIGS. 2-6, the hearing aid 150 (e.g., sound processing unit 152) and the cochlear implant system 102 (e.g., sound processing unit 106) communicate with one another over a wired or wireless communication channel/link. The communication channel is a bidirectional communication channel and may be, for example, a magnetic inductive (MI) link, a short-range wireless link, such as a Bluetooth® link that communicates using short-wavelength Ultra High Frequency (UHF) radio waves in the industrial, scientific and medical (ISM) band from 2.4 to 2.485 gigahertz (GHz), or another type of wireless link. Bluetooth® is a registered trademark owned by the Bluetooth® SIG. While FIGS. 2-6 show an embodiment where the cochlear implant system 102 and hearing aid 150 communicate with each other, in other embodiments, each of the cochlear implant system 102 and hearing aid 150 operate independently.

Figure 5:
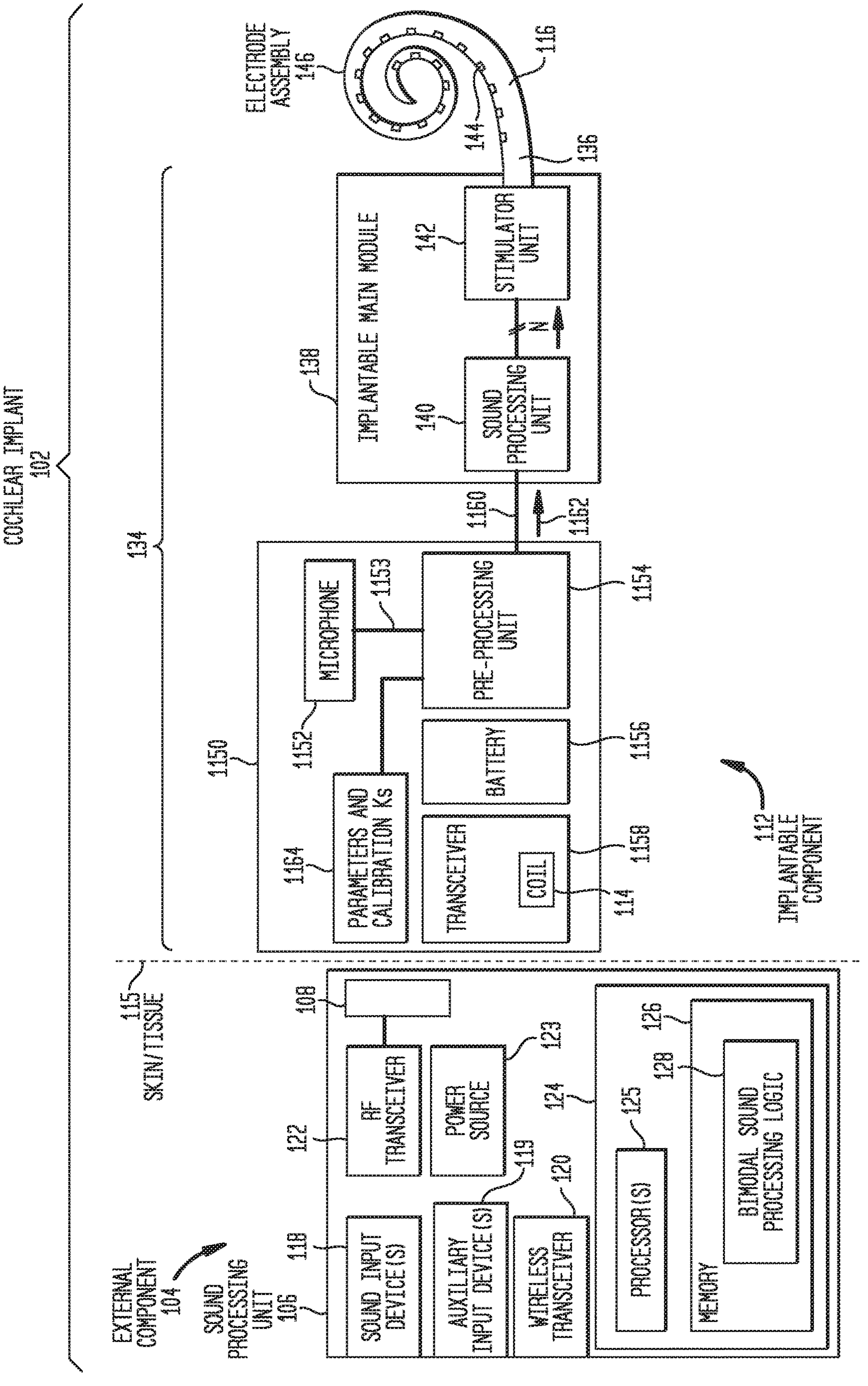
FIG. 5 is a block diagram of a cochlear implant forming part of the bimodal hearing system of FIG. 2.
Figure 6:
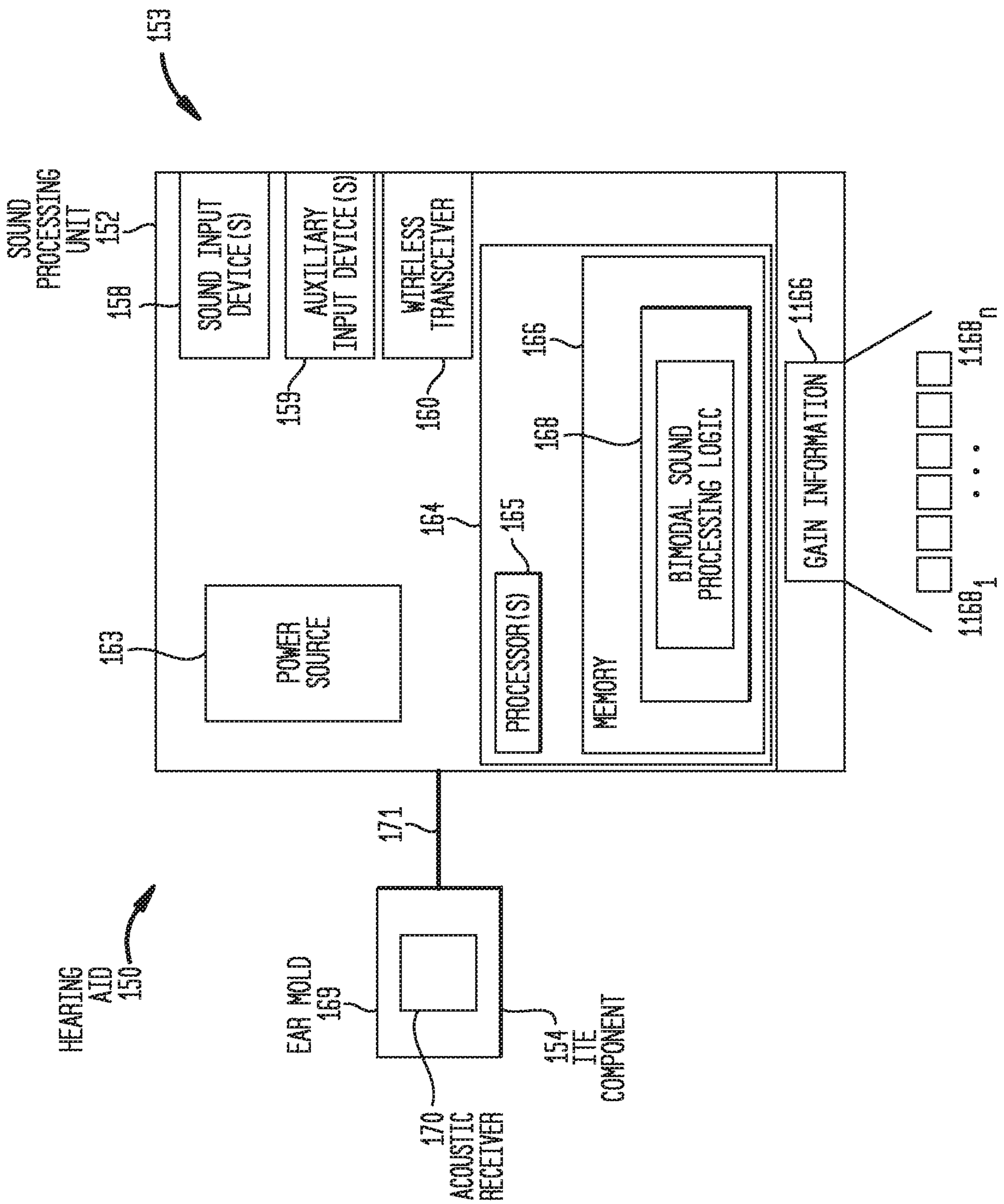
FIG. 6 is a block diagram of a hearing aid forming part of the bimodal hearing system of FIG. 2.

FIG. 5 is a block diagram illustrating further details of cochlear implant system 102, while FIG. 6 is a block diagram illustrating further details of hearing aid 150. As noted, the external component 104 of cochlear implant system 102 includes a sound processing unit 106. The sound processing unit 106 comprises one or more input devices 113 that are configured to receive input signals (e.g., sound or data signals). In the example of FIG. 5, the one or more input devices 113 include one or more sound input devices 118 (e.g., microphones, audio input ports, telecoils, etc.), one or more auxiliary input devices 119 (e.g., audio ports, such as a Direct Audio Input (DAI), data ports, such as a Universal Serial Bus (USB) port, cable port, etc.), and a wireless transmitter/receiver (transceiver) 120. However, it is to be appreciated that one or more input devices 113 may include additional types of input devices and/or less input devices (e.g., the wireless transceiver 120 and/or one or more auxiliary input devices 119 could be omitted).

The sound processing unit 106 also comprises a closely-coupled transmitter/receiver (transceiver), referred to as or radio-frequency (RF) transceiver 122, a power source 123, and a processing module 124. The processing module 124 comprises one or more processors 125 and a memory 126 that includes bimodal sound processing logic 128. In the examples of FIGS. 2-6, the sound processing unit 106 is an off-the-ear (OTE) sound processing unit (i.e., a component having a generally cylindrical shape and which is configured to be magnetically coupled to the recipient's head). However, it is to be appreciated that embodiments of the techniques presented herein may be implemented by sound processing units having other arrangements, such as by a behind-the-ear (BTE) sound processing unit configured to be attached to and worn adjacent to the recipient's ear, including a mini or micro-BTE unit, an in-the-canal unit that is configured to be located in the recipient's ear canal, a body-worn sound processing unit, etc.

The implantable component 112 comprises an implant body 134 (e.g., main module), a lead region 136, and the intra-cochlear stimulating assembly 116, all configured to be implanted under the skin/tissue (tissue) 115 of the recipient. The implant body 134 generally comprises a hermetically-sealed housing 138 in which a sound processing unit 140 and a stimulator unit 142 are disposed.

As noted, stimulating assembly 116 is configured to be at least partially implanted in the recipient's cochlea. Stimulating assembly 116 includes a plurality of longitudinally spaced intra-cochlear electrical stimulating contacts 144 (e.g., electrodes) that collectively form a contact or electrode array for delivery of electrical stimulation (current) to the recipient's cochlea.

Stimulating assembly 116 including a distal end 146 that extends through an opening in the recipient's cochlea (e.g., cochleostomy, the round window, etc.) and has a proximal end connected to stimulator unit 142 via lead region 136 and a hermetic feedthrough (not shown in FIG. 5). Lead region 136 includes a plurality of conductors (wires) that electrically couple the stimulating contacts 144 (e.g., electrodes) to the stimulator unit 142.

An auxiliary unit 1150 includes an implantable microphone 1152, pre-processing unit 1154, and a battery 1156. The auxiliary unit 1150 also includes an internal/implantable coil 114 that is generally external to the auxiliary unit 1150, but which is connected to the transceiver 1158 via a hermetic feedthrough (not shown in FIG. 5). The auxiliary unit 1150 also includes parameters and calibration constants 1164 of the implantable microphone 1152.

In the embodiment of FIG. 5, the implantable microphone 1152 is an implantable microphone or implantable sound sensor that is configured to detect sound signals. As such, because components of cochlear implant system 102 are configured to be implanted, cochlear implant system 102 operates, for at least a finite period of time, without a need of a computing system. Some embodiments use any implantable microphone, and/or any microphone position. For example, in certain embodiments, implantable microphone 1152 includes a subcutaneous microphone. In some embodiments, the implantable microphone 1152 includes a microphone implanted in an inner ear of the recipient. In some embodiments, implantable microphone 1152 includes a microphone implanted in the middle ear of the recipient. In some other embodiments, the implantable microphone 1152 is implanted in a middle ear of the recipient. Alternatively, the implantable microphone 1152 is implanted in or adjacent to an car canal of the recipient. The implantable microphone 1152 provides microphone information, such as one or more of sound pressure, acceleration, or velocity to pre-processing unit 1154 in the auxiliary unit 1150 via an electrical connection 1160. In some embodiments, the electrical connection 1160 includes a wired connection extending between the implantable microphone 1152 and pre-processing unit 1154. Pre-processing unit 1154 performs microphone pre-processing. This includes, in some embodiments, conversion of microphone information such as pressure, velocity into audio signals 162 representing sound signals detected by the implantable microphone 1152. In some embodiments, pre-processing unit 1154 reduces or suppresses body-noise detected by the implantable microphone 1152. Thus, in some embodiments, audio signals 1162 include electrical representations of received sound signals from which body-noise have been at least partially removed.

The parameters and calibration constants 1164 define one or more of a frequency response of the implantable microphone 1152, a vibration calibration measurement of the implantable microphone 1152, or a noise floor associated with the implantable microphone 1152. As described above, some embodiments of this disclosure provide for a method of establishing one or more parameters and calibration constants of the implantable microphone 1152.

As noted, the cochlear implant system 102 includes the external coil 108 and the implantable coil 114. The external coil 108 and implantable coil 114 are typically wire antenna coils each comprised of multiple turns of electrically insulated single-strand or multi-strand platinum or gold wire. Generally, a magnet is fixed relative to each of the external coil 108 and the implantable coil 114. The magnets fixed relative to the external coil 108 and the implantable coil 114 facilitate the operational alignment of the external coil 108 with the implantable coil 114. This operational alignment of the coils enables the external component 104 to transmit data, as well as possibly power, to the implantable component 112 via a closely-coupled wireless link formed between the external coil 108 and the implantable coil 114. In certain examples, the closely-coupled wireless link is a radio frequency (RF) link. However, various other types of energy transfer, such as infrared (IR), electromagnetic, capacitive and inductive transfer, may be used to transfer the power and/or data from an external component to an implantable component and, as such, FIG. 5 illustrates only one example arrangement.

As noted above, sound processing unit 106 includes the processing module 124. The processing module 124 is configured to convert received input signals (received at one or more of the one or more input devices 113) into output signals for use in stimulating a first ear (e.g., right ear 141R) of the recipient (i.e., the processing module 124 is configured to perform sound processing on input signals received at the sound processing unit 106). Stated differently, the one or more processors 125 are configured to execute the bimodal sound processing logic 128 in memory 126 to convert the received input signals into output signals that represent electrical stimulation for delivery to the recipient. As described further below, the bimodal sound processing logic 128, when executed, operates with corresponding bimodal sound logic in the hearing aid 150 (i.e., bimodal sound processing logic 168) to map Inter-aural Level Difference (ILD) cues to inter-aural loudness difference cues for the recipient.

In the embodiment of FIG. 5, the output signals are provided to the RF transceiver 122, which transcutaneously transfers the output signals (e.g., in an encoded manner) to the implantable component 112 via external coil 108 and implantable coil 114. That is, the output signals 145 are received at the transceiver 1158 via implantable coil 114 and provided to the stimulator unit 142. The stimulator unit 142 is configured to utilize the output signals to generate electrical stimulation signals (e.g., current signals) for delivery to the recipient's cochlea via one or more stimulating contacts 144. In this way, cochlear implant system 102 electrically stimulates the recipient's auditory nerve cells, bypassing absent or defective hair cells that normally transduce acoustic vibrations into neural activity, in a manner that causes the recipient to perceive one or more components of the received sound signals.

FIGS. 4 and 5 illustrate one specific example arrangement for cochlear implant system 102 that includes an external component 104. However, it is to be appreciated that embodiments of the present invention may be implemented with cochlear implants, or other implantable hearing prostheses, having alternative arrangements. For example, embodiments of the present invention can be implemented with a so-called "totally implantable" cochlear implant. A totally implantable cochlear implant is a cochlear implant in which all is components are configured to be implanted under skin/tissue of a recipient. Because all components are implantable, a totally implantable cochlear implant operates, for at least a finite period of time, without the need of an external device. An external device can be used to, for example, charge an internal power source (battery). The external device may be a dedicated charger or a conventional external component.

It is also to be appreciated that embodiments presented herein can be implemented with different types of partially or fully/totally implantable auditory prostheses having an implantable microphone. For example, embodiments presented herein can be implemented with middle ear stimulators, bone conduction devices, brain stem implants, electro-acoustic cochlear implants or electro-acoustic devices, and other devices providing acoustic, mechanical, and/or electrical stimulation to a recipient and having an implantable microphone.

Returning to the examples of FIGS. 4-6, as noted above, and as shown in FIG. 6, hearing aid 150 comprises a sound processing unit 152 and an in-the-ear (ITE) component 154. The sound processing unit 152 comprises one or more input devices 153 that are configured to receive input signals (e.g., sound or data signals). In the example of FIG. 6, the one or more input devices 153 include one or more sound input devices 158 (e.g., microphones, audio input ports, telecoils, etc.), one or more auxiliary input devices 159 (e.g., audio ports, such as a Direct Audio Input (DAI), data ports, such as a Universal Serial Bus (USB) port, cable port, etc.), and a wireless transmitter/receiver (transceiver) 160. However, it is to be appreciated that one or more input devices 153 may include additional types of input devices and/or less input devices (e.g., the wireless transceiver 160 and/or one or more auxiliary input devices 159 could be omitted).

The sound processing unit 152 also comprises a power source 163, and a processing module 164. The processing module 164 comprises one or more processors 165 and a memory 166 that includes bimodal sound processing logic 168. In some embodiments, the memory 166 also stores gain information 1166. The gain information 1166 defines gain information for each of a plurality of frequency bands (e.g., gain information $\mathbf{1168}_1 \ldots \mathbf{1168}_n$) subject to amplification by the sound processing unit 152. Some embodiments vary gain applied by the sound processing unit 152 according to a frequency band of the amplified sound. This differing gain in each frequency band is based on information gathered during a fitting session of a recipient (e.g., such as the fitting session described above with respect to FIG. 1A). In some cases, a gain for one or more frequency bands is set to a very low or even zero value to avoid amplifying sounds within frequency bands to which the recipient is generally unresponsive. By avoiding amplification in these bands, overall sound quantity and user experience is improved.

As noted, the hearing aid 150 also comprises an ITE component 154. The ITE component 154 comprises an ear mold 169 and an acoustic receiver 170 disposed in the ear mold. The ear mold 169 is configured to positioned/inserted into the ear canal of the recipient and retained therein. The acoustic receiver 170 is electrically connected to the sound processing unit 152 via a cable 171.

As noted above, sound processing unit 152 includes the processing module 164. The processing module 164 is configured to convert received input signals (received at one or more of the one or more input devices 153) into output signals for use in stimulating the second ear (e.g., left ear 141L) of the recipient (i.e., the processing module 164 is configured to perform sound processing on input signals received at the sound processing unit 152). Stated differently, the one or more processors 165 are configured to execute bimodal sound processing logic 168 in memory 166 to convert the received input signals into processed signals that represent acoustic stimulation for delivery to the recipient.

In the embodiment of FIG. 6, the processed signals are provided to the acoustic receiver 170 (via cable 171), which in turn acoustically stimulates the left ear 141L. That is, the processed signals, when delivered to the acoustic receiver 170, cause the acoustic receiver to deliver acoustic stimulation signals (acoustic output signals) to the ear of the recipient. The acoustic stimulation signals cause vibration of the ear drum that, in turn, induces motion of the cochlea fluid causing the recipient to perceive the input signals received at the one or more of the input devices 153. As described further below, the bimodal sound processing logic 168, when executed, operates with the bimodal sound processing logic 128 in the cochlear implant system 102 to ensure that the Inter-aural Level Difference (ILD) cues are mapped reliably to inter-aural loudness difference across the two ears for the recipient.

FIG. 6 illustrates one specific example arrangement for hearing aid 150. However, it is to be appreciated that embodiments of the present invention may be implemented with hearing aids having alternative arrangements.

In summary, FIGS. 5-6 illustrate a bimodal hearing system 100 in which the first ear (e.g., right ear 141R) of the recipient is electrically stimulated (e.g., electrical stimulation signals are used to evoke a hearing sensation at the first ear). However, in the bimodal hearing system 100, the left ear 141L of the recipient is acoustically stimulated (e.g., acoustic stimulation signals are used to evoke a hearing sensation at the second ear).

As noted above, in normal hearing, the main binaural cues for left/right sound localization are the Inter-aural Level Difference (ILD) and the Inter-aural Time Difference (ITD). A primary benefit of a bilateral cochlear implant system is that such systems can provide a recipient with Inter-aural Loudness differences that are consistent with the ILD cues observed. However, since the two hearing prostheses forming a bimodal system deliver different types of stimulation to the recipient, the two hearing prostheses generally use different processing strategies to generate those different types of stimulation. Due to the use of different processing strategies, the ILD measurements (measures) do not reliably map to loudness differences. That is, due to the differing processing involved at each prosthesis, existing bimodal systems do not provide recipients with correct ILD cues. For example, cochlear implants generally have a much smaller dynamic range than hearing aids and utilize different loudness growth functions. Even without any head-shadow, there are loudness mismatches across the two cars. With head-shadow, the loudness differences across the two cars becomes even more inconsistent (e.g., better in certain situations, worse in other situations, but overall inconsistent).

In a bimodal hearing system that includes a hearing aid and cochlear implant, the hearing aid and cochlear implant are typically independently "fit" (e.g., independently configured) for the recipient in order to maximize audibility. In addition, the dynamic range available for loudness perception are typically mismatched between the hearing aid and cochlear implant, the rate of growth of loudness could be different across the two ears and across different recipients, and the hearing aid and the cochlear implant process signals differently due to different design objectives. All of these mismatches make it difficult to make use of binaural cues, such as ILDs, and, accordingly, make it difficult for recipients of bimodal hearing systems to properly determine the location of the source of the sound signals. Accordingly, it would be advantageous to preserve binaural ILD cues in a bimodal hearing system, at least in certain listening environments.

As such, presented herein are techniques that enable a bimodal hearing system to provide a recipient with ILD cues, despite the different processing strategies and other mismatches between the prostheses (e.g., different dynamic ranges, different loudness growth rates, etc.). More specifically, in the example of FIGS. 2-5, the cochlear implant system 102 and hearing aid 150 are each configured to receive sound signals and determine a corresponding loudness measures (loudness estimates) for the input signals and output signals. These estimates are, in turn, used to determine adjustments to the operation (e.g., gain settings) of one or both of the hearing aid 150 or cochlear implant system 102 to ensure that the loudness differences between the sounds captured at each of the prostheses follow the ILD.

Figure 7:
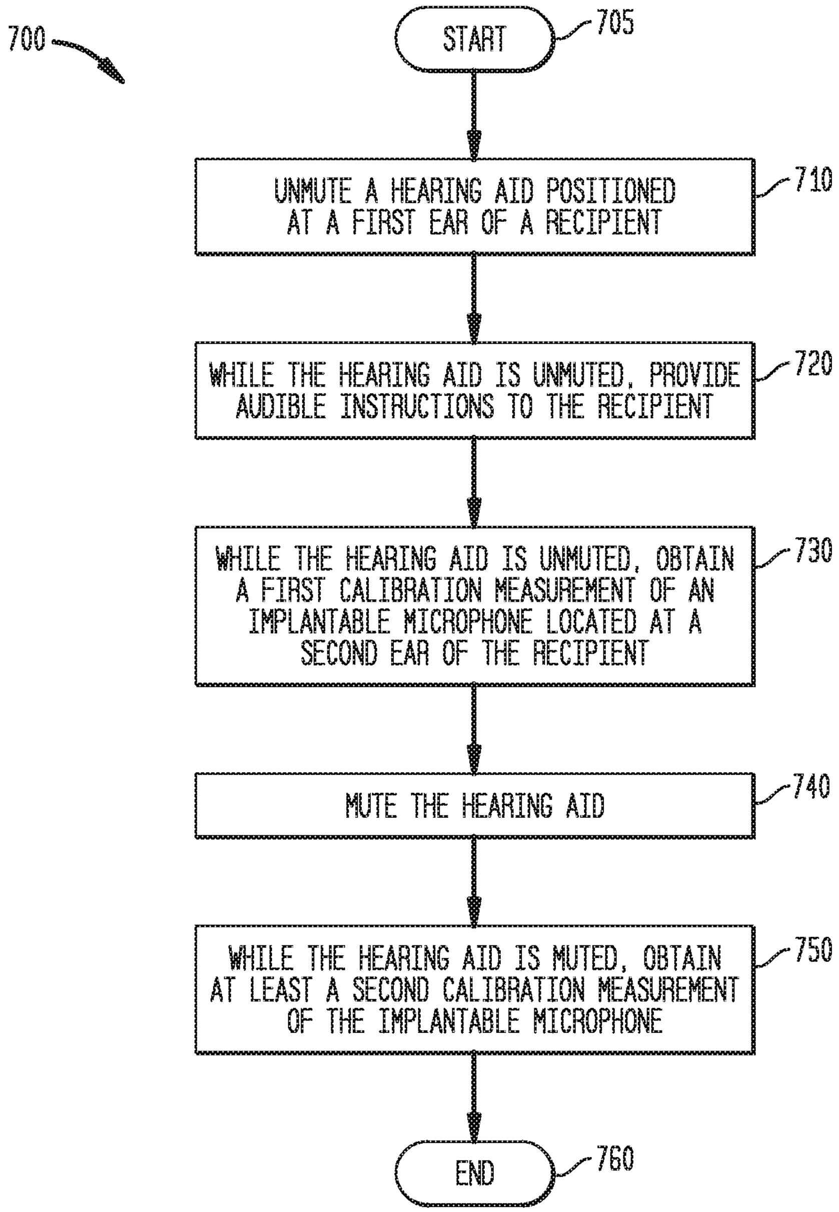
FIG. 7 is flowchart illustrating an example method of fitting a bimodal hearing system, in accordance with certain embodiments presented herein.

FIG. 7 is a flowchart of a method for fitting a cochlear implant with an implantable microphone that is in accordance with an example embodiment. In some embodiments, one or more of the functions discussed below with respect to FIG. 7 are performed by hardware processing circuitry. For example, in some embodiments, instructions stored in a memory, (e.g., memory 804 discussed below with respect to FIG. 8) configure hardware processing circuitry (e.g., processing unit 802 also discussed below with respect to FIG. 8) to perform one or more of the functions discussed below with respect to FIG. 7 and/or method 700.

After start operation 705, method 700 moves to operation 710, where a hearing aid positioned at a first ear of a recipient is unmuted. For example, as discussed above with respect to FIG. 1A, the clinician 1102 directs the recipient 1104 to unmute the hearing aid 150. In some embodiments, the hearing aid is a contralateral hearing aid.

Operation 720 provides audible instructions to the recipient while the hearing aid is unmuted. For example, as discussed above, embodiments that determine equalizing an implantable microphone, such as the implantable microphone 1152, the clinician communicates relative complex instructions to the recipient. For example, the clinician instructions the recipient, at least in some embodiments, to signal the clinician when they detect a sound. Furthermore, in some embodiments, the clinician instructs the recipient to scratch their head while a calibration measurement is obtained.

In operation 730, a first calibration measurement of the implantable microphone is obtained. The implantable microphone is located within a second ear of the recipient (different than the first ear of the recipient where the hearing aid is located). In some embodiments, the calibration measurement relates to one or more of a noise floor, a frequency response of the microphone, or a vibration calibration.

For example, in some embodiments, the calibration measurement characterizes a frequency response of the implantable microphone. Some embodiments generate a noise stimulus, such as a wide band noise stimulus (e.g., via speaker 1106 or the hearing aid 150) while collecting the first calibration measurement. In some cases, the noise stimulus is generated at a level substantially above a noise floor. During calibration of the frequency response, the recipient is generally instructed to stay still and face the speaker (or other device that is generating the noise stimulus). Some embodiments collect the first calibration measurement while the recipient is scratching their head. Some embodiments determine the first calibration measurement during a period of relative silence. Note that some embodiments determine multiple sets of calibration measurements, some during periods of relative silence and others during the presence of a noise stimulus.

Calibration measurements are used to configure knee-points and/or thresholds of expansion. The calibration measurement also configure noise reduction algorithms. When characterizing a noise floor, calibration measurement is collected in relative silence. The recipient is generally instructed to avoid movement. A noise floor measurement measures the system noise of the device, and is used to control the knee points of a gain expansion algorithm. Gain is reduced for input below a kneepoint, thereby suppressing the level of the noise floor within the output signal.

In embodiments that calibrate vibration processing, the recipient is instructed to perform an action that generates vibration, such as scratching their head (or counting to ten). No other acoustic input is provided during the vibration calibration. Calibration data determined for vibration define relevant knee-points and/or thresholds. Vibration is cancelled using body noise reduction, an active noise cancellation approach that uses both the implanted microphone and accelerometer. The vibration based input (scratching) is used to parameterize and control the body noise reduction.

In operation 740, the hearing aid is muted. In some embodiments, the clinician (e.g., clinician 1102) instructs the recipient (e.g., recipient 1104) to manually mute the hearing aid. Some embodiments provide for programmatic control of the hearing aid by the clinician, such that the clinician selectively mutes and/or unmutes the hearing aid without the assistance of the recipient. In some embodiments, the computing device or computing system automatically unmutes, mutes, and unmutes the hearing aid as needed to collect calibration measurements.

In operation 750, a second calibration measurement of the implantable microphone is obtained while the hearing aid is muted. As described above with respect to operation 730, some embodiments generate a noise stimulus (e.g., via speaker 1106 or the hearing aid 150) while collecting the second calibration measurement, while others collect the second calibration measurement during a period of relative silence. Generally, the second calibration measurement is analogous to the first calibration measurement obtained in operation 730. Obtaining analogous calibration measurements both with and without the hearing aid unmuted provide for a determination of an influence of the hearing aid on a received signal, and provide for setting of hearing aid gain parameters, thus improving the user experience.

Some embodiments that determine frequency response of the implantable microphone both with the hearing aid on and with the hearing aid off compare the two frequency response measurements to determine an influence of the hearing aid. In some embodiments, the influence of the hearing aid is determined by configuring the hearing aid to generate an audio signal. A response from the implantable microphone is measured while the hearing aid is generating the audio signal to determine the hearing aid's influence. This approach avoids the need for a separate acoustic stimulus, such as a speaker.

Some embodiments calibrate the implantable microphone based on the first calibration measurement and the second calibration measurement. For example, some embodiments compare the first and second calibration measurements to a reference measurement, and determine one or more equalization gains for the implantable microphone based on the comparison.

In some embodiments, at least two measurements are used to equalize the implanted microphone, both made with the hearing aid muted. First, a measurement made by an external microphone on a cochlear implant (CI) sound processor is performed. Second, another measurement is made using the implantable microphone. The implantable microphone is then adjusted to match the external microphone.

In some embodiments, a further measurement is made with the contra hearing aid unmuted, which indicates how the hearing aid output is coupled via bone/skull to the implant. This information is used to limit the hearing aid output (as described above).

Some embodiments configure the cochlear implant and/or the implantable microphone based on the calibration parameters determined by method 700. For example, in some embodiments, the calibration parameters are downloaded to the cochlear implant system 102 and stored in the parameters and calibration constants 1164. Hardware processing circuitry of the cochlear implant (e.g. the pre-processing unit 1154), along with an acoustic operating program embedded with the hardware processing circuitry, then applies the calibration parameters to signals (e.g. signals 1153) generated by the microphone (e.g. implantable microphone 1152) in order to modify those signals and apply an equalized measurement to the signals. For example, one or more of expansion and/or noise reduction are performed on signals received from the microphone. In some embodiments, the calibration information determined from the first and second measurements define data that allows the hardware processing circuitry to identify and reduce vibration induced signals.

Some embodiments of method 700 iteratively collect calibration information based on recipient feedback to sounds across a plurality of different frequency bands. For example, in multiple iterations of method 700, operation 730 and 750, in these embodiments, generate sounds within different frequency bands, and a response from the recipient is collected. In some cases, a recipient is generally unresponsive to sounds (e.g., does not perceive a sound that can be interpreted) within one or more frequency bands, regardless of a level of gain applied to the sound by the hearing aid or the cochlear implant. Thus, for those frequency bands to which the recipient is unresponsive, some embodiments disable amplification so as to minimize the amplification of sound artifacts within those frequency bands, which have been found to generally degrade the recipient's ability to perceive sound quantity even within other frequency bands. As discussed above with respect to FIG. 5, some embodiments of a cochlear implant provide for selective amplification of particular frequency bands, while inhibiting amplification of other frequency bands. Thus, some embodiments of method 700 include configuring a cochlear implant based on the unresponsive frequency bands determined as described above (e.g. by setting the gain information 1166). The unresponsive frequency bands are configured to have zero gain or amplification, while sounds within frequency bands to which the recipient exhibited a meaningful response are set according to gain thresholds established as part of the fitting process.

In some embodiments, the calibration parameters determined by method 700 are downloaded to a cochlear implant via a configuration interface. For example, as discussed above with respect to FIG. 1B, some cochlear implants provide for the reception of configuration information via auxiliary input devices, such as the one or more auxiliary input devices 119 discussed above. By downloading the calibration parameters determined by method 700, the cochlear implant is able to selectively control gain of sound in a plurality of different frequency bands. Furthermore, the cochlear implant provides for improved isolation of skull vibrations that are induced via use of a hearing aid simultaneously with the cochlear implant.

After operation 750 completes, method 700 moves to end operation 760.

Figure 8:
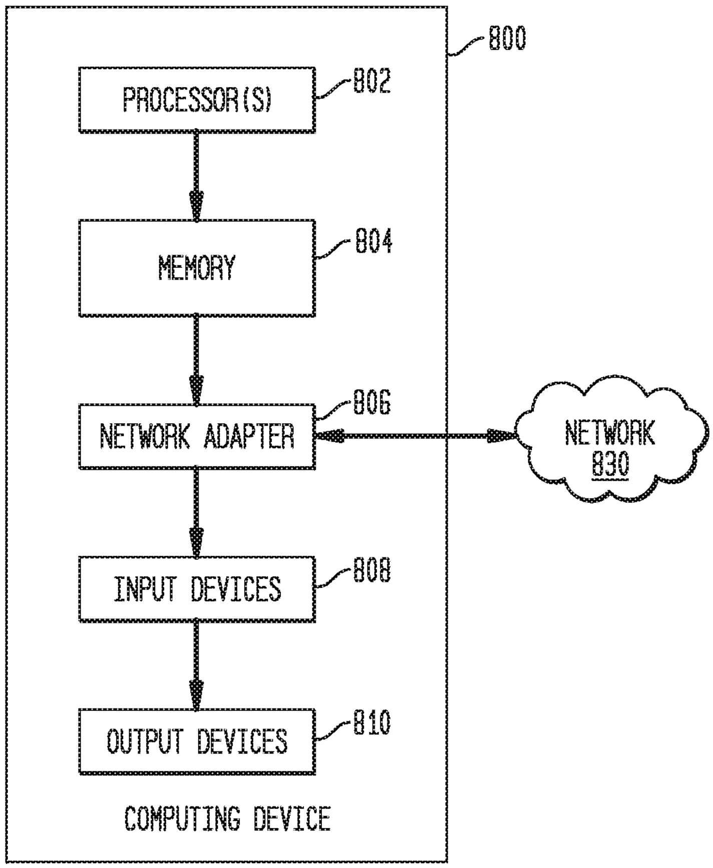
FIG. 8 is a block diagram of an example computing device configured to implement certain aspects of the techniques presented herein.

FIG. 8 illustrates an example arrangement for a suitable apparatus or computing system (computing device) configured to implement aspects of the techniques presented herein. Computing devices, environments, or configurations that can be suitable for use with examples described herein include, but are not limited to, fitting systems, personal computers, server computers, hand-held devices, laptop devices, multiprocessor systems, microprocessor-based systems, programmable consumer electronics (e.g., smart phones), network PCs, minicomputers, mainframe computers, tablet computers (tablets), distributed computing environments that include any of the above systems or devices, and the like. The computing devices/systems presented herein can be a single virtual or physical device operating in a networked environment over communication links to one or more remote devices. The remote device can be a hearing device or hearing device system (e.g., implantable component 112, or cochlear implant system 102, or hearing aid 150 as illustrated above with respect to FIG. 1B), a personal computer, a server, a router, a network personal computer, a peer device or other common network node. For ease of description, the computing system shown in FIG. 8 is referred to as computing system 800, and can represent a basic arrangement for computing device 105 of FIGS. 1A-1B and FIG. 2.

In its most basic configuration, the computing system 800 includes at least one processing unit 802 and memory 804. The processing unit 802 includes one or more hardware or software processors (e.g., Central Processing Units) that can obtain and execute instructions. The processing unit 802 can communicate with and control the performance of other components of the computing system 800.

The memory 804 is one or more software or hardware-based computer-readable storage media operable to store information accessible by the processing unit 802. The memory 804 can store, among other things, instructions executable by the processing unit 802 to implement applications or cause performance of operations described herein, as well as other data. The memory 804 can be volatile memory (e.g., RAM), non-volatile memory (e.g., ROM), or combinations thereof. The memory 804 can include transitory memory or non-transitory memory. The memory 804 can also include one or more removable or non-removable storage devices. In examples, the memory 804 can include RAM, ROM, EEPROM (Electronically-Erasable Programmable Read-Only Memory), flash memory, optical disc storage, magnetic storage, solid state storage, or any other memory media usable to store information for later access. In examples, the memory 804 encompasses a modulated data signal (e.g., a signal that has one or more of its characteristics set or changed in such a manner as to encode information in the signal), such as a carrier wave or other transport mechanism and includes any information delivery media. By way of example, and not limitation, the memory 804 can include wired media such as a wired network or direct-wired connection, and wireless media such as acoustic, RF, infrared and other wireless media or combinations thereof.

In the illustrated example, the computing system 800 further includes a network adapter 806, one or more input devices 808, and one or more output devices 810. The one or more input devices 808 and the one or more output devices 810 are sometimes collectively referred to herein as a user interface and can comprise the same or different components. The computing system 800 can include other components, such as a system bus, component interfaces, a graphics system, a power source (e.g., a battery), among other components.

The network adapter 806 is a component of the computing system 800 that provides network access (e.g., access to at least one network 830). The network adapter 806 can provide wired or wireless network access and can support one or more of a variety of communication technologies and protocols, such as ETHERNET, cellular, BLUETOOTH, near-field communication, Radio Frequency (RF), infrared (IR), among others. The network adapter 806 can include one or more antennas and associated components configured for wireless communication according to one or more wireless communication technologies and protocols.

The one or more input devices 808 are devices over which the computing system 800 receives input from a clinician, such as a recipient during method 700 described above. The one or more input devices 808 can include physically-actuatable user-interface elements (e.g., buttons, switches, or dials), touch screens, keyboards, mice, pens, and voice/sound input devices, among others input devices.

The one or more output devices 810 are devices by which the computing system 800 is able to provide output to a user. The output devices 810 can include, displays, receivers, and/or speakers, among other output devices.

It is to be appreciated that the arrangement for computing system 800 shown in FIG. 8 is merely illustrative and that aspects of the techniques presented herein may be implemented at a number of different types of systems/devices. For example, the computing system 800 could be a laptop computer, tablet computer, mobile phone, surgical system, etc.

As should be appreciated, while particular uses of the technology have been illustrated and discussed above, the disclosed technology can be used with a variety of devices in accordance with many examples of the technology. The above discussion is not meant to suggest that the disclosed technology is only suitable for implementation within systems akin to that illustrated in the figures. In general, additional configurations can be used to practice the processes and systems herein and/or some aspects described can be excluded without departing from the processes and systems disclosed herein.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and processes to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure. Further, the disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:

1. A method, comprising:

unmuting a hearing aid positioned at a first ear of a recipient;

while the hearing aid is unmuted, providing audible instructions to the recipient;

while the hearing aid is unmuted, obtaining at least a first calibration measurement of an implantable microphone located at a second ear of the recipient;

muting the hearing aid; and while the hearing aid is muted, obtaining at least a second calibration measurement of the implantable microphone.

2. The method of claim 1, further comprising calibrating the implantable microphone based on the first calibration measurement and the second calibration measurement.

3. The method of claim 2, further comprising iteratively performing the unmuting, providing, obtaining, muting, and second obtaining to generate a plurality of first calibration measurements and a plurality of second calibration measurements, wherein the calibrating of the implantable microphone is based on each of the plurality of first and second calibration measurements.

4. The method of claim 1, wherein the hearing aid is configured to amplify sound signals across a plurality of frequency bands, and wherein the configuring of the acoustic operating program for the hearing aid comprises:

selectively disabling amplification of sound signals by the hearing aid in one or more of frequency bands.

5. The method of claim 1, further comprising:

generating a noise stimulus, wherein the first calibration measurement and the second measurement are performed during the generation of the noise stimulus.

6. The method of claim 5, wherein the noise stimulus is generated by the hearing aid.

7. The method of claim 1, further comprising:
while the hearing aid is muted, measuring a first response from an external microphone;
while the hearing aid is muted, measuring a second response from the implantable microphone;
comparing the first response to the second response; and
determining equalization gains of the implantable microphone based on the comparing.

8. The method of claim 7, further comprising:
applying the equalization gains to an additional measurement from the implantable microphone;
determining, based on the applying, an equalized measurement; and
modifying signal processing associated with the implantable microphone based on the equalized measurement.

9. The method of claim 1, wherein the first calibration measurement and the second measurement are performed during a period of relative silence, and wherein the method further comprises:
determining parameters based on the first calibration measurement and the second measurement; and
performing, based on the determined parameters, expansion and noise reduction on an input sound captured by the implantable microphone.

10. The method of claim 9, wherein the first calibration measurement and the second calibration measurement each characterize a noise floor associated with the implantable microphone.

11. The method of claim 1, wherein the audible instructions provided to the recipient instruct the recipient to perform a vibration inducing activity, and wherein the method further comprising identifying and reducing vibration induced signals based on the first calibration measurement and the second measurement.

12. The method of claim 11, wherein the first calibration measurement and the second calibration measurement each comprise a vibration calibration measurement for the implantable microphone.

13. The method of claim 1, further comprising configuring an acoustic operating program for the hearing aid based on one or more of the first calibration measurement or the second calibration measurement.

14. The method of claim 1, wherein the hearing aid is configured to amplify sound signals across a plurality of frequency bands, and wherein the method comprises:
determining a sound level perceived within each of the plurality of frequency bands; and
disabling amplification of sound signals by the hearing aid in the one or more of the plurality of frequency bands.

15. The method of claim 14, wherein the determining comprises:
for each of the plurality of frequency bands:
instructing the recipient to prepare to recognize a sound;
generating a sound within the frequency band;
inquiring as to whether the recipient heard the sound;
receiving an answer to the inquiring; and
determining the sound level perceived within the frequency band based on the answer.

16. The method of claim 14, wherein the disabling of amplification comprises:
disabling amplification of a frequency band in response to a perceived sound level of the frequency band being below a predefined threshold.

17. One or more non-transitory computer readable storage media comprising instructions that, when executed by a processor, cause the processor to perform operations comprising:
enabling a contralateral hearing aid positioned at a first ear of a recipient, wherein an implantable auditory prosthesis comprising an implantable sound sensor is implanted at a second ear of the recipient;
while the contralateral hearing aid is enabled, providing instructions to the recipient via the contralateral hearing aid;
disabling the contralateral hearing aid;
while the contralateral hearing aid is disabled, performing at least one first calibration measurement of the implantable sound sensor; and
re-enabling the contralateral hearing aid.

18. The one or more non-transitory computer readable storage media of claim 17, wherein the operations further comprise:
while the hearing aid is disabled, performing at least one second calibration measurement of the implantable sound sensor;
comparing the first calibration measurement and the second calibration measurement; and
determining equalization gains of the implantable sound sensor based on the comparing.

19. The one or more non-transitory computer readable storage media of claim 18, wherein the operations further comprise:
applying the equalization gains to an additional measurement from the implantable sound sensor;
determining, based on the applying, an equalized measurement; and
modifying signal processing associated with the implantable sound sensor based on the equalized measurement.

20. The one or more non-transitory computer readable storage media of claim 17, wherein the operations further comprise generating a noise stimulus, wherein the at least one first calibration measurement is performed during the generation of the noise stimulus.

21. The one or more non-transitory computer readable storage media of claim 20, wherein the noise stimulus is generated by the contralateral hearing aid.

22. The one or more non-transitory computer readable storage media of claim 17, wherein the at least one first calibration measurement is performed during a period of relative silence, and wherein the operations further comprise:
determining parameters based on the at least one first calibration measurement; and
performing, based on the determined parameters, expansion and noise reduction on an input sound captured by the implantable sound sensor.

23. The one or more non-transitory computer readable storage media of claim 17, wherein the instructions provided to the recipient instruct the recipient to perform a vibration inducing activity, and wherein the operations further comprise identifying and reducing vibration induced signals based on the first and second calibration measurements.

24. The one or more non-transitory computer readable storage media of claim 23, wherein the vibration inducing activity is head scratching.

25. The one or more non-transitory computer readable storage media of claim 17, wherein the operations further comprise determining an acoustic operating program for the contralateral hearing aid based on the one or more first calibration measurement.

26. The one or more non-transitory computer readable storage media of claim 25, wherein the contralateral hearing aid is configured to amplify sound signals across a plurality of frequency bands, and wherein determining an acoustic operating program for the contralateral hearing aid comprises selectively disabling amplification of sound signals by the contralateral hearing aid in one or more of frequency bands.

27. The one or more non-transitory computer readable storage media of claim 17, wherein the contralateral hearing aid is configured to amplify sound signals across a plurality of frequency bands, and wherein the operations further comprise:

determining a sound level perceived within each of the plurality of frequency bands; and disabling amplification of sound signals by the contralateral hearing aid in one or more of the plurality of frequency bands based on the determined sound level perceived within the respective frequency band.

28. The one or more non-transitory computer readable storage media of claim 27, wherein the determining comprises:

for each of the plurality of frequency bands:

instructing the recipient to prepare to recognize a sound;

generating a sound within the frequency band;

inquiring as to whether the recipient heard the sound;

receiving an answer to the inquiry; and determining the sound level perceived within the frequency band based on the answer.

29. The one or more non-transitory computer readable storage media of claim 17, wherein the operations further comprise disabling amplification of a frequency band in response to a perceived sound level of the frequency band being below a predefined threshold.

* * * * *